UNITED STATES PATENT OFFICE 2,507,030

SULFOSUCCINATE ESTERS OF 4-ALKYL-PHENOXYETHANOLS

Kathryn L. Lynch, Stamford, Conn., assignor to American Cyanamid Company, New York, N. Y., a corporation of Maine No Drawing. Application April 4, 1947, Serial No. 739,369

7 Claims. (Cl. 260—481)

This invention relates to esters of sulfosuccinic acid and their methods of preparation, and more particularly to sulfosuccinate esters of 4-alkylphenoxyethanols. A principal object of the invention is to provide a new class of chemical compounds having a variety of useful properties, as will hereinafter be more fully described.

The new compounds of my invention are defined by the following structural formula

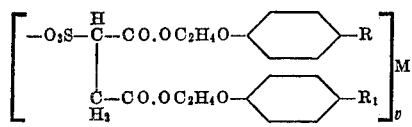

in which R and $R_1$ are alkyl radicals which preferably contain 3 or more carbon atoms, M is a salt-forming base, and $v$ is the valence of M. The preferred compounds of the invention are those in which R and $R_1$ are branched-chain aliphatic radicals.

The compounds defined by the above formula are preferably prepared by esterifying maleic anhydride or maleic or fumaric acid with the corresponding 4-alkylphenoxyethanol to produce the diester, followed by sulfonating this ester to form the sulfosuccinate. Preferably the sulfonation is carried out by heating the ester with an aqueous solution of sodium bisulfite or sodium metabisulfite, or of the corresponding potassium or ammonium compounds. By this method the alkali metal and ammonium salts of di-(4-alkylphenoxyethyl) sulfosuccinic acid are obtained directly.

The corresponding salts of other bases are preferably produced by first acidifying an alcoholic solution of the alkali metal or ammonium salts, whereby the free sulfosuccinic acid diester is obtained, filtering off the inorganic salt of the acid used and reacting the sulfosuccinic acid ester with the desired base. Salts of other metals such as calcium, strontium, barium, zinc, chromium, silver, iron, cobalt, nickel, aluminum, tin, lead, cadmium, bismuth, tungsten and the like are prepared by adding stoichiometric quantities of their oxides or hydroxides to the alcoholic sulfosuccinic acid diester followed by stirring until the salt formation is complete. Salts of organic bases such as methylamine, ethylamine, mono-, di- or triethanolamine, amylamine, higher aliphatic amines such as n-dodecylamine, n-hexadecylamine or n-octadecylamine, aromatic amines such as aniline, toluidines, xylidines, naphthylamines and the like and heterocyclic bases such as nicotine, quinine, pyridine, lutidine, hydroxyethyl pyridine, quinoline and alkaloids may also be prepared by the same method.

Sulfosuccinate diesters of any 4-alkylphenoxyethanol may be prepared by the method described above, and are included within the broad scope of the invention. Representative 4-alkylphenoxyethyl alcohols which may be used are 4 - isopropyl - phenoxyethanol, 4 - n - butyl - phenoxyethanol, 4-secondary butyl-phenoxyethanol, 4 - secondary amyl - phenoxyethanol, 4 - tertiary amyl - phenoxyethanol, 4 - n - hexyl-phenoxyethanol, the corresponding 4 - isomeric hexylphenoxyethanols, 4 - secondary heptyl - phenoxyethanol, 4 - n - octyl - phenoxyethanol and the corresponding 4-isomeric octyl-phenoxyethanols, 4-n-dodecyl and 4-secondary dodecylphenoxyethanols and the 4-wax hydrocarbon phenoxyethanols. The great majority of these alcohols are obtained by alkylating phenol with an olefin containing the number of carbon atoms desired in the 4-alkyl substituent in the presence of sulfuric acid, hydrofluoric acid, aluminum chloride or other known alkylation catalyst to obtain the 4-alkyl phenol which is then condensed with ethylene oxide to produce the corresponding 4 - alkylphenoxyethanol. The 4 - dodecyl and 4-wax hydrocarbon phenols are preferably prepared by first monochlorinating a kerosene fraction or a hydrocarbon wax containing about 20–22 up to about 35–40 carbon atoms followed by condensing the chlorinated hydrocarbon with phenol in the presence of aluminum chloride.

A number of important properties are possessed by representative members of the above-described class of compounds. I have found that the diesters of sulfosuccinic acid with 4-alkylphenoxyethanols in which the alkyl radicals contain from 3 to 8 carbon atoms, when used in the form of their water-soluble salts, have good wetting properties and also possess to a high degree the property of inhibiting the formation of fog on glass or other transparent surfaces exposed to a warm, humid atmosphere. Moreover, these esters retain their anti-fogging properties after repeated exposures of transparent objects coated therewith to humid atmospheres, and therefore enjoy a long effective life when used for this purpose.

Although all of the water-soluble di-(4-alkylphenoxyethyl) sulfosuccinates have good anti-fogging properties those compounds in which the 4-alkyl radical is a branched-chain hydrocarbon radical of 3–6 carbon atoms appear to be the best. The 4-tertiary butyl and 4-tertiary amyl-phenoxyethyl diesters of sulfosuccinic acid, in the form of their alkali metal, zinc or ammonium salts, are outstanding both in their anti-fogging properties and their resistance to removal or attenuation by condensed vapor, and constitute the preferred embodiments of the class. The preferred anti-fogging agents of the present invention are therefore defined accurately by the formula

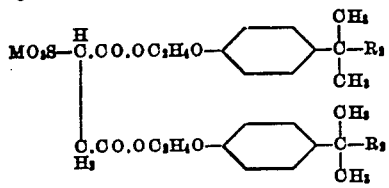

in which M is a monovalent inorganic salt-forming base; i. e., ammonium or an alkali metal, and $R_2$ is a straight-chain alkyl radical of 1–4 carbon atoms; i. e., methyl, ethyl, n-propyl or n-butyl.

Another field of utility of the compounds of my invention is in the breaking or resolution of emulsions of the water-in-oil type, such as oil-field emulsions. For this purpose the preferred compounds are those in which the 4-alkyl radicals of the phenoxyethyl groups contain from 4 to 12 or more carbon atoms in order to obtain a high degree of oil solubility in the compounds. Although the alkali metal, ammonium, zinc, morpholine and other water-soluble salts of di-(4-alkylphenoxyethyl) sulfosuccinic acid may be used for this purpose the salts of organic bases and the calcium, barium, strontium and other heavy metal salts are also useful, since the demulsifiers are ordinarily employed in quantities of 1:500 up to 1:20,000, based on the weight of the emulsion.

The calcium, barium, strontium, aluminum, chromium, nickel and other polyvalent metal salts of di-(4-alkylphenoxyethyl) sulfosuccinic acid in which the alkyl radicals contain 4 or more carbon atoms are soluble in organic solvents such as alcohols and liquid aromatic hydrocarbons of the type of benzene and toluene and may be used as oil-soluble detergents. They are also soluble in hydrocarbon lubricating oils, and therefore may be used as detergents in turbine oils and in lube oils of the type used in the crankcases of internal combustion engines. For this purpose they are ordinarily added to the oils in amounts of 0.1% up to about 5% by weight.

The di-(4-alkylphenoxyethyl) sulfosuccinic acid salts are also useful in the treatment of textiles. In addition to their utility as wetting and detergent agents they may be impregnated into the textiles for special purposes. Thus, for example, the copper, cadmium and mercury salts are good mildew-proofing agents for cellulosic textiles and the amine or quinine salts may be applied to woolens as mothproofing agents.

The invention will be further illustrated by the following examples, which show specific embodiments thereof. It should be understood, however, that any of the compounds described by the structural formulas given above may be prepared by the methods of these examples, and are included within the scope of the invention as defined by the appended claims.

*Example 1*

Di-(2-p-tertiarybutylphenoxyethyl) maleate was prepared by heating a mixture of 29.5 parts by weight of maleic anhydride, 140 parts of p-tertiarybutylphenoxyethanol and 1 part of p-toluenesulfonic acid in 40 parts of toluene, using agitation and a water trap. The esterification was 97% complete in 3 hours after which time the crude product was washed with 2.5% NaOH solution and then with water. Toluene and excess alcohol were stripped off by heating at reduced pressure.

The maleic ester was sulfonated by refluxing for 17 hours with a solution of 31.5 parts of sodium bisulfite in a mixture of 150 parts of ethanol and 35 parts of water. It was then filtered and evaporated to dryness. The di-(2-p-tertiarybutylphenoxyethyl) sodium sulfosuccinate was obtained as a pale yellow, waxy solid the analysis of which was as follows:

|  | Saponification No. | Sulfur | Sulfated Ash |
|---|---|---|---|
|  |  | Per cent | Per cent |
| Obtained | 189 | 5.89 | 13.7 |
| Theory | 196 | 5.59 | 12.4 |

Calculated purity=96.5%.

*Example 2*

Di-(2-p-tertiaryamylphenoxyethyl) maleate was prepared by heating a mixture of 156 parts by weight of p-tertiaryamylphenoxyethanol with 33 parts of maleic anhydride and 1 part of p-toluenesulfonic acid in 60 parts of toluene at 140° C. for 3.5 hours, after which time the esterification was 95% complete. The crude ester was neutralized and washed in the usual manner and the excess alcohol and solvent distilled off under reduced pressure. The ester was then sulfonated by adding it to a solution of 33 parts of sodium bisulfite in a mixture of 100 parts of ethanol and 30 parts of water and refluxing with agitation for 8 hours. Upon evaporating to dryness the di-(2-p-tertiaryamylphenoxyethyl) sodium sulfosuccinate was obtained as a brittle yellow-brown wax. Analysis gave the following results:

|  | Saponification No. | Sulfur | Sulfated Ash |
|---|---|---|---|
|  |  | Per cent | Per cent |
| Obtained | 186 | 5.55 | 13.2 |
| Theory | 187 | 5.33 | 11.8 |

Calculated purity=99.5%.

*Example 3*

The wetting power of the products of Examples 1 and 2 was determined by the Draves test at 30° C. The sinking time in seconds of a standard skein at various concentrations of the wetting agents is given in the following table:

|  | Conc. in Grams per Liter | | | | | | |
|---|---|---|---|---|---|---|---|
|  | 5 | 2.5 | 1.5 | 1.0 | 0.5 | 0.25 | 0.15 |
| Product of— |  |  |  |  |  |  |  |
| Example 1 |  | 14 |  | 25 | 39 | 59 | 93 |
| Example 2 | 25 | 31 | 43 | 53 | 95 |  |  |

*Example 4*

A reaction flask equipped with a reflux condenser was charged with 244 grams (1 mol + 10% excess) of 4-n-hexylphenoxyethanol, 49 grams (0.5 mol) of maleic anhydride and 5 grams of p-toluenesulfonic acid in 250 cc. of toluene. The charge was heated to boiling and refluxed until no more water was given off, the reaction time being 14 hours. The solution was then cooled, washed with 3% sodium hydroxide solution and then with water, and the toluene and excess hexylphenoxyethanol were stripped off by heating to 200° C. at a pressure of 0.5 mm. of mercury. The di-(4-n-hexylphenoxyethyl) maleate was obtained as a thick viscous oil.

A mixture of 262 grams (0.5 mol) of the above ester and 53 grams (0.25 mol + 10% excess) of sodium metabisulfite, 55 grams of water and 165 grams of ethyl alcohol was heated to reflux and maintained at this temperature for 6 hours. The solution was then cooled, diluted with an equal quantity of ethyl alcohol and filtered to remove the excess bisulfite. The solvent was then evaporated and the product was dried at 100° C. It was a white solid which dispersed in hot water to form a soft gel, was soluble in cold water to an 0.5% solution, but was easily soluble in alcohol and toluene.

Example 5

63 grams of the product of Example 4 were dissolved in 500 grams of ethyl alcohol and 10.2 grams of 96% sulfuric acid were added slowly with stirring, which was continued for one hour after the addition of acid was complete. The precipitated sodium sulfate was removed by filtration.

To 112.5 grams of the di-(4-n-hexylphenoxyethyl) sulfosuccinic acid solution so obtained there was added 3 grams of calcium hydroxide and the mixture was stirred for 24 hours at room temperature. The solution was filtered and the alcohol evaporated and the product was dried at 100° C. The calcium salt was obtained as a light brown solid. This product was dissolved in 10-W lubricating oil to an 0.5% solution, a sample of which was subjected to the Catalytic Indiana oxidation test at 341° F. After 70 hours the sludge produced by the oxidation was soft and easily removed from the walls of the tube, indicating that the added compound possessed good detergent and sludge-dispersing properties.

Another 112.5 gram sample of the alcohol solution of di-(4-n-hexylphenoxyethyl) sulfosuccinic acid was neutralized by the addition of a 100% excess of mercuric oxide. The product, a dark brown solid, was dissolved in toluol and applied to cotton duck cloth. A sample of the treated cloth, together with an untreated sample, was inoculated with a water suspension of *Chaetomium globosum* and incubated for 14 days at 30° C. After this period the untreated sample was covered with mold, while the treated sample was unchanged in appearance and retained its original tensile strength.

Example 6

A flask was charged with 198.5 grams (1 mol) of 98% pure 2-p-sec-butylphenoxyethanol, 49 grams (0.50 mol) of maleic anhydride, 5 grams of p-toluenesulfonic acid and 225 cc. of toluene. The water collected in the moisture trap adapter. The final temperature of the reaction mixture was 125° C. and the reaction time was 12.5 hours. The di-($\beta$-p-sec-butylphenoxyethyl) maleate solution was cooled, shaken with 300 cc. of 3% sodium hydroxide solution and then washed with water until neutral. The toluene, water, and any unreacted alcohol were removed by heating the product up to 200° C. at first under water pump vacuum and then at 0.5 mm. There was obtained 238 grams of the maleate which was a light red viscous oil. The yield was quantitative.

A mixture of 234 grams (0.50 mol) of di-($\beta$-p-sec-butylphenoxyethyl) maleate, 53 grams (0.25 mol+10% X. S.) of sodium bisulfite (meta), 50 grams of water and 150 grams of ethyl alcohol were refluxed with stirring for 6 hours at 80° C. The reaction mixture was cooled, 158 grams of ethyl alcohol were added and the solution was filtered. The filtered solution was evaporated and the product was dried at 100° C. The product was a white, tacky solid, yield 285 grams, theoretical. Analysis was:

|  | Per Cent $SO_3$ | Per Cent $SO_4$ Ash |
|---|---|---|
| Found | 13.88 | 12.20 |
| Theory | 13.68 | 12.30 |

Example 7

To a solution of 120 grams (0.218 mol) of the sodium di-($\beta$-p-sec-butylphenoxyethyl) sulfosuccinate and 600 cc. of ethanol, 5.83 cc. of 96% sulfuric acid was added dropwise with stirring. After 2 hours of stirring at room temperature the precipitated sodium sulfate was filtered off. The filtrate was a 22% solution of the sulfosuccinic acid.

A mixture of 12 grams (100% X. S.) of zinc hydroxide and 165 grams of (0.065 mol) the 22% di-($\beta$-p-sec-butylphenoxyethyl) sulfosuccinic acid solution was stirred at room temperature for 24 hours. The solution was filtered to remove excess zinc hydroxide and evaporated. The product weighed 33 grams after drying at 100° C. and was a brown tacky solid.

A mixture of 10 grams (100% X. S.) of calcium hydroxide and 165 grams (0.065 mol) of the 22% di-($\beta$-p-sec-butylphenoxyethyl) sulfosuccinic acid solution was stirred for 24 hours at room temperature. The solution was filtered and evaporated. The product was dried at 100° C. The yield was 35 grams of a tan tacky solid.

To 195 grams (0.077 mol) the 22% di-($\beta$-p-sec-butylphenoxyethyl) sulfosuccinic acid solution 6.5 cc. (0.075 mol) of morpholine was added dropwise. The solution was then slightly alkaline. No filtration was necessary. After drying, the product solidified to a brown opaque mass at room temperature. Yield was 49 grams, theoretical.

Example 8

The following test procedure was used to demonstrate the anti-fogging properties of compounds of the present invention.

A solution of the composition under test is applied to both sides of a pane of glass, which is then cooled to about 0° C. and thrust into a warm, humid atmosphere at about 35° C. Resistance to fogging is measured by the length of time a standard test chart remains visible when viewed through the glass, the length of the test being 10 seconds. The panel is then allowed to dry and is dipped in water, allowed to dry again, and again chilled and thrust into the humid atmosphere. This is repeated until the composition loses its effectiveness as an anti-fogging agent. The effectiveness is determined by the number of lines per inch that remain visible on the test chart and the length of time during which they are visible.

Aqueous solutions of the product of Example 1 were tested by this method at varying concentrations. The results are given in the following table, in which the first or "zero" cycle indicates the results before dipping and the following headings indicate the number of times the panel was dipped in water. In each column the symbol V indicates the number of lines per inch clearly visible on the test chart and T is the number of seconds during which they were visible.

|  | 0 | | 3 | | 4 | | 5 | | 6 | | 10 | |
|---|---|---|---|---|---|---|---|---|---|---|---|---|
|  | V | T | V | T | V | T | V | T | V | T | V | T |
| Ex. 1, 2.5% Aq. Soln | 56 | 10 | 3.5 | 10 | 0 | 7 | --- | --- | --- | --- | --- | --- |
| Ex. 1, 4% Aq. Soln | 56 | 10 | 28 | 10 | 5 | 10 | 0 | 6 | --- | --- | --- | --- |
| Ex. 1, 5% Aq. Soln | 56 | 10 | 56 | 10 | 40 | 10 | 10 | 10 | --- | --- | --- | --- |
| Ex. 1, 8% Ethanol Soln | 56 | 10 | 56 | 10 | 40 | 10 | 56 | 10 | 56 | 10 | 40 | 10 |
| Ex. 2, 8% Ethanol Soln | 56 | 10 | 28 | 10 | 40 | 10 | 40 | 10 | 40 | 10 | 28 | 10 |

These results show the effectiveness and permanency of the water-soluble compounds of the present invention as anti-fogging agents. Even greater permanency is obtained when they are used in admixture with a hydrophilic adhesive such as gum tragacanth, water-soluble starch and the like. A very good composition of this type is prepared by dissolving 4 grams of the wetting agent in 45 cc. of warm water and adding 0.5 gram of gum tragacanth dissolved in a small quantity of alcohol.

This is a continuation-in-part of my copending application Serial No. 614,090, filed September 1, 1945, which was abandoned after the present application was filed.

What I claim is:
1. Compounds of the formula

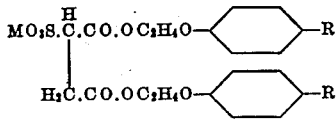

in which M is a salt-forming radical and R is an alkyl radical of 3–8 carbon atoms.

2. Compounds of the formula

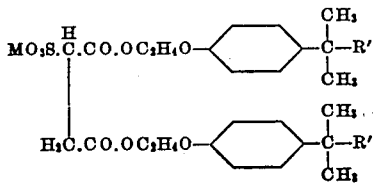

in which M is a salt-forming radical and R' is a straight-chain alkyl radical of 1–4 carbon atoms.

3. Compounds according to claim 2 in which M is an alkali metal.

4. Compounds of the formula

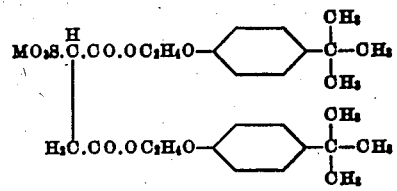

in which M is a salt-forming radical.

5. Compounds according to claim 4 in which M is an alkali metal.

6. Compounds of the formula

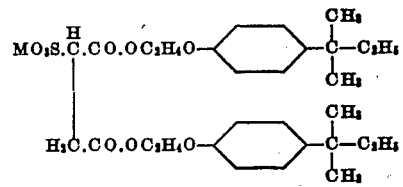

in which M is a salt-forming radical.

7. Compounds according to claim 6 in which M is an alkali metal.

KATHRYN L. LYNCH.

REFERENCES CITED

The following references are of record in the file of this patent:

UNITED STATES PATENTS

| Number | Name | Date |
|---|---|---|
| 2,028,091 | Jaeger | Jan. 14, 1936 |
| 2,072,085 | De Groote et al. | Mar. 2, 1937 |
| 2,166,144 | Harris | July 18, 1939 |
| 2,176,423 | Jaeger | Oct. 17, 1939 |